350-96.21 SR
XR 3,541,341
SEARCH ROOM

REDUNDANT FIBER-OPTIC LIGHT GUIDE CONSTRUCTION

SUBSTITUTE FOR MISSING XR

Filed Feb. 21, 1968

Plug connector (col. 6)

Converter in receptacle

INVENTOR:
BERNARD D. LEETE,
BY Albert S. Richardson Jr.
ATTORNEY

United States Patent Office 3,541,341

Patented Nov. 17, 1970

3,541,341

REDUNDANT FIBER-OPTIC LIGHT GUIDE CONSTRUCTION

Bernard D. Leete, Newtown Square, Pa., assignor to General Electric Company, a corporation of New York Filed Feb. 21, 1968, Ser. No. 707,091

Int. Cl. G02b 5/14

U.S. Cl. 250—227 15 Claims

ABSTRACT OF THE DISCLOSURE

An optical link comprising fiber-optic light guides is used in a signal transmission system. Redundant electricity-to-light converters produce light signals which are transmitted through light guides to a plurality of light-to-electricity converters, and operation of the system is monitored by additional light sensing means. Each light guide is terminated by a connector plug which is adapted to be connected to a receptacle having a light-electricity converter mounted therein.

BACKGROUND OF THE INVENTION

This invention generally relates to a signal transmission arrangement utilizing fiber-optic light guides. This invention more specifically relates to a fiber-optic light guide system for transmitting control pulses useful in controlling high voltage systems.

A simple form of signal transmission system is just an electrical conductor connected between an input and an output. Such a system, however, is not satisfactory for all applications. Frequently it is desired that there be some degree of isolation between an input and output of a signal transmission system so that changes at the output are not reflected back to the input (feedback) or to provide electrical insulation between the output and the input so as to withstand extremely high voltage differences. Transformers are often used for this purpose, but magnetic coupling as provided by a transformer is not satisfactory for all applications. For example, leakage inductance associated with a transformer tends to increase its response time, and some feedback from the output to the input of a transformer is almost inevitable. Also the cost of high-voltage transformers may be excessive.

One way to overcome the deficiencies of electrical or magnetic coupling in a signal transmission system is through utilization of an optical link therein. The isolation between input and output afforded by an optical link in a signal transmission system is complete inasmuch as the input and output are electrically separate. Further, an optical link contains no inherent rapidity of response limitations analogous to leakage inductance of a transformer. Therefore, coupling between inputs and outputs at widely different electrical potentials and over a wide frequency range is possible utilizing an optical link.

Optical energy is commonly used wastefully because of its low cost. For example, in reading a book, it is customary to illuminate the room, or at least the area, in which one is sitting rather than to illuminate just the page or the work which one is reading. However, when optical energy is used for control purposes, the nature of the input is usually such that efficient use of optical energy is dictated. More specifically, it is necessary that the optical energy be confined to the area of actual use.

SUMMARY OF THE INVENTION

Accordingly, it is an object of this invention to provide a control signal transmission system utilizing an efficient optical link to provide control circuit isolation.

It is a more specific object of this invention to provide a reliable control signal transmission system having an optical link in which one or more defined areas at differing locations remote from an optical source are illuminated through fiber-optic light guides.

Another object of this invention is to improve the reliability of a signal transmission system by providing a redundant fiber-optic light guide link in which duplicate sources illuminate each of one or more optical receivers.

Another object of this invention is to provide a fiber-optic light guide link in a signal transmission system in which monitoring means is provided to monitor a plurality of optical sources so as to detect failure thereof.

Another object of this invention is to provide a fiber-optic light guide link in a signal transmission system in which means is provided for easy disconnection of the optical link from the signal transmission system.

Briefly, according to one embodiment of the invention, a plurality of light guides, each of which comprises a plurality of optic fibers, is provided with a separate light-to-electricity converter associated with each of the light guides at an output end thereof. Constituent optic fibers of each light guide at the opposite or input end are separated into individual fibers and recombined to form a plurality of source tips in a manner such that each of the source tips contains an approximately equal number of optic fibers from each and every light guide. Associated with each source tip is an electricity-to-light converter which emits light pulses in response to applied electrical control signals.

DETAILED DESCRIPTION

The subject matter which is regarded as the invention is particularly pointed out and distinctly claimed in the concluding portion of this specification. The invention, both as to organization and method of operation, together with further objects and advantages thereof, may be understood by reference to the following description taken in connection with the accompanying drawings in which:

Figures 1, 2, 3:
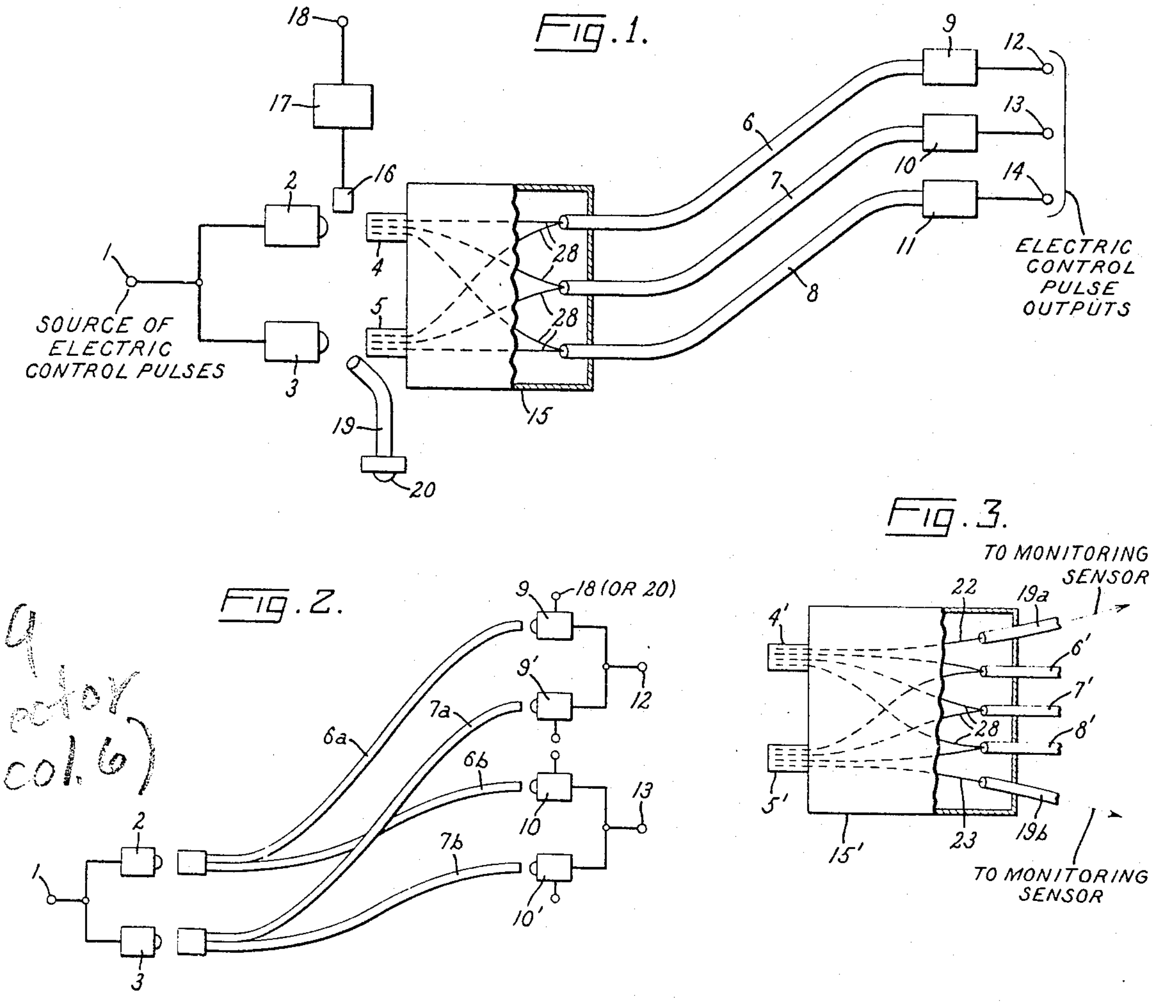
FIG. 1 is a diagrammatic representation of a signal transmission system illustrating one embodiment of my invention.
FIG. 2 is a similar diagram of another embodiment of the system.
FIG. 3 illustrates an alternate light guide arrangement incorporating means for monitoring operation of the optical path.

As shown in FIG. 1, discrete electrical input signals are fed through terminal 1 to a light source comprising two duplicate electricity-to-light converters 2 and 3. The redundant converters 2 and 3 simultaneously emit radiant energy (light) on receipt of an input signal, which radiation or light falls upon source tips 4 and 5 comprised of a plurality of optic fibers. Bundles of parallel optic fibers form elongated light guides (pipes) 6, 7 and 8 which tranmit light from the common source to separate light-to-electricity converters (receivers) 9, 10, and 11 which in turn convert the light impulses to electrical signals which are then available as outputs at remote terminals 12, 13 and 14. While this system has general utility, it is particularly well suited for transmitting simultaneous light signals from the common source 1, 2, 3 to different levels of a solid-state electric valve in accordance with the teachings of U.S. Pat. No. 3,355,600 granted on Nov. 28, 1967, to N. W. Mapham and assigned to the General Electric Co.

The light sources 2 and 3 shown in FIG. 1 may be any kind of devices which emit radiation when activated. While other forms of radiant energy, such as microwaves, are contemplated, I presently prefer to use light which can be in either the visible or the invisible portions of the spectrum. Light emitting diodes made of gallium-arsenide or gallium-arsenide-phosphide have been found useful for this purpose. When gallium-arsenide diodes are used, the light emitted by the light source is invisible radiation in a narrow band of the near infra-red region. In order to activate the light source on command, the light emitting diode is connected in a circuit which energizes it in response to receipt of an electrical control signal, or alternatively an optical shutter in front of a continuously illuminated source of light is arranged to be opened in response to the control signal. Generally, a light source is selected which emits radiation that is efficiently transported through the particular radiant energy transmission medium being used, and a corresponding light-to-electricity converter (such as a phototransistor) is selected which is sensitive to the same radiation. Preferably the radiant energy paths between the respective emitters and receivers comprise electro-magnetic wave quides such as the light pipes 6, 7, and 8 shown in FIG. 1.

Each of the illustrated light pipes comprises a set of at least two parallel optic fibers 28. The term "optic" as used herein is not intended to imply only visible light. Optic fibers for either visible or invisible light are well known in the art and may be made of glass or a suitable plastic. Each fiber is clad with a transparent material of lower refractive index than the core material of the fiber so that light travels in a zig-zag path through the transparent core of each fiber by internal reflections from the cladding. A plurality of these optic fibers are bundled randomly in a common sheath or jacket to form each of the light pipes 6, 7, and 8. The amount of light transmitted through each light guide is a function of the number and core area of constituent fibers, the intensity of the light source, and the loss characteristics of the light guide.

In the interest of reliability, redundancy is desired. It is achieved as shown in FIG. 1 by disassembling the input end of the light guides into individual optic fibers 28 and crossing and recombining the optic fibers in new groupings to form source tips 4 and 5, each of which is illuminated by a separate source. What is intended to be indicated by enclosure 15 in FIG. 1 is that the light emitter 2 has associated therewith the input ends of approximately half of the optic fibers 28 from each of the light pipes 6, 7, and 8, while the light emitter 3 has associated therewith the input ends of the remaining optic fibers. Then one source can provide half of the illumination at each light-to-electricity converter and the other source will provide the other half. Of course, more than two sources and source tips can be utilized, and more or less than three light pipes can be used, depending upon the number of separate output signals desired. Generally, optic fibers of the light guides are separated and recombined in a manner such that each of the source tips contains an approximately equal number of optic fibers from each and every light guide. When the source illumination area is not perfectly uniform, it is preferable that the groups of fibers be bundled together in random fashion to obtain more even distribution of light. With such a redundant arrangement, if one source fails, each of the receivers will continue to receive light even though it is about half of the previous optical power. The receiving portion of the system is designed so that less than half normal optical power is sufficient for operation.

Crossing and recombination of the optic fibers is achieved in an enclosure 15 which is internally potted with a suitable material so as to maintain the fibers in place and protect them from damage. With glass fibers suitable epoxy resins may be used, but with plastic light guides which are manufactured with an outer jacket already in place, it is preferable to use a potting material with a lower index of refraction than the fiber core. Translucent silicone rubber has such a low index of refraction that it is generally suitable for this purpose, but other materials may also be suitable. There is a possibility that in removing the outer jacket from the light guides prior to separating individual optic fibers, the cladding on some of the fibers might be damaged, creating areas of light leakage or absorption. The use of a transparent or translucent silicon rubber potting compound having an index of refraction less than that of the optic fiber core material tends to repair any damage done to the fiber cladding by replacing the function of any cladding that might have been stripped off.

An extending form of optical redundancy is shown in FIG. 2 where electrical signals are produced at two separate output terminals 12 and 13 in response to light supplied by either one of two light emmitters 2 and 3 on receipt of an eletcrical input signal at the common source terminal 1. Each receiving station in FIG. 2 is seen to comprise redundant light-to-electricity converters respectively associated with the output ends of light paths coupled to the two emitters. Thus the output signal at 12 can be produced either by a converter 9 in response to light supplied from the emitter 2 via a first path *6a* comprising at least one optic fiber, or by a duplicate converter 9′ in response to light supplied from the companion emitter 3 via a redundant path *7a* of at least one optic fiber. Similarly, the output signal at 13 can be produced either by a cenverter 10 on receipt of light from the emitter 2 via a third path *6b* or by a duplicate converter 10′ which is responsive to light supplied by the emitter 3 via a fourth path *7b*. The set of fibers comprising the first and third paths *6a* and *6b* can share a common sheath in the vicinity of their input or source ends, thereby forming a branched light pipe emanating from the emitter 2, and the second and fourth paths *7a* and *7b* can similarly comprise a branched light pipe emanating from the emitter 3.

With a redundant fiber-optic light guide system, a portion of the system can fail without loss of integrity. For example, if one of the light emitters 2 or 3 were to cease functioning properly, the system is able to continue delivering light from the common source to all of the receiving stations. Unless such a failure is readily detected and corrected, the purpose of a redundant system is thwarted. To detect abnormal conditions of this kind, monitoring means is desirable. One arrangement for monitoring operation of the light source is shown in FIG. 1. In this arrangement, a photosensor 16 is placed near the light emitter 2 so as to monitor the operation thereof. This sensor is placed so as to pick up stray light from the associated emitter without interfering with the main beam of light entering the light guide tip 4 which is disposed in proximity thereto. A prism could be disposed adjacent each light emitter to direct stray light to the photosensor. The sensor 16, when activated by light from the emitter 2, produces an output signal which is amplified by an amplifier 17 which in turn operates an indicator lamp 18. Ideally, the sensitvity of the amplifier is adjusted so that the indicator lamp is normally illuminated and goes out whenever the intensity of light emitted by the source 2 falls to a level just above that required for the receivers to operate properly when supplied from only this one emitter. Thus, the monitor is able to detect gradual deterioration as well as catastrophic failures of a light source. When a monitor light goes out it indicates that the corresponding light source may be incapable of maintaining system operation in the event of failure of the other light emitter and, therefore, corrective action is necessary. Alternatively the monitor lamp 18 could be arranged to go on to indicate a failure. However, in this case, a failure of the indicator itself or its associated amplifier 17 or detector 16 could result in inability to indicate failure of the light source 2. With the former arrangement, the extinction of the monitor lamp indicates the need for corrective action. It can then be determined whether repairs are needed for the light source or the monitor system.

In practice the light emitter 3 will be monitored in the same fashion as emitter 2. However, in order to illustrate another arrangement for monitoring operation of the light source, a different scheme is shown in conjunction with the second emitter 3 in FIG. 1. This scheme is premised on the use of visible light, and it comprises an auxiliary light guide 19 having an inlet disposed in proximity to the source tip 5 and an output terminating in a lens 20 at a remote location where the loss of light due to failure of the emitter 3 can be conveniently perceived. As is indicated in FIG. 2, either of the foregoing light monitoring arrangements can be coupled to the system in proximity to the output ends of the light pipes 6, 7, etc., instead of adjacent to the respective input ends of these pipes, thereby monitoring the integrity of the primary light paths as well as the light emitters 2 and 3.

In FIG. 3, a pair of auxiliary light guides 19*a* and 19*b* are seen to comprise optic fibers 22 and 23 whose inlets are disposed in the source tips 4′ and 5′, respectively, along with the input ends of the various optic fibers 28 comprising each of the signal transmitting light pipes 6′, 7′, and 8′. The outlet of each of the auxiliary guides 19*a* and 19*b* is connected to a remote monitoring sensor which, as previously described, can comprise either a sensor-amplifier-indicator combination or simply a lens. If standard commercially available light guides are used, each monitor branch 19*a*, 19*b* contains the same number of fibers as each of the main pipes 6′, 7′ and 8′, but, ideally, only half of the fibers is used and the other half is cut off or potted in darkness at the source end in order to simulate the number of light paths in each main pipe illuminated by each light emitter. The length of the monitor branch can also be adjusted to simulate operation of a main light pipe when operated from only one-half of the light source. This makes the monitor function more meangingful and enables detection of some types of optical transmission deterioration as well as optical source deterioration.

In one practical embodiment of my invention, the control signals applied to the input terminal 1 of the illustrated transmission system were in the form of rapidly recurring (60 hertz) electrical pulses each having a very short duration, and the electricity-to-light converters were arranged to generate intense peaks of visible light in response to these pulses. Nevertheless, the average intensity of the resulting light impulses supplied by the emitters 2 and 3 was insufficient to be reliably detected by the direct monitoring scheme shown at 19, 20 in FIG. 1. To solve this problem I provide relatively low-power bias means for continuously energizing the light emitters so that each normally supplies light which, although relatively weak, is visually perceivable for monitoring purposes. On receipt of each input signal, a short pulse of light of substantially greater intensity (e.g. 100 times brighter) is emitted, and the light receivers 9, 10, and 11, which are normally quiescent produce their respective output signals in response thereto. One arrangement embodying this aspect of the invention is shown in FIG. 4.

Figure 4:
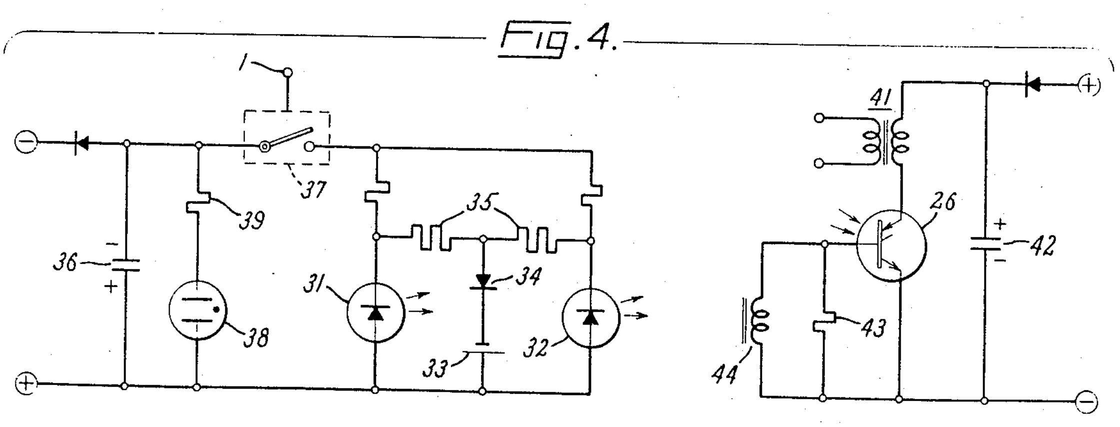
FIG. 4 is a simplified schematic diagram of redundant light emitters and a light receiver that can be used in a practical embodiment of the invention.

In FIG. 4 the light emitting means at the source end of the signal transmission system is shown as two light emitting diodes 31 and 32 which correspond to the light sources 2 and 3 of FIGS. 1 and 2. Both are continuously energized by relatively low bias current from any suitable D-C source such as the illustrated battery 33 which, in series with a diode 34 and a resistor 35, shunts each diode. While energized solely by this bias current, each of the diodes 31 and 32 supplies weak light to the associated light paths and monitors of the system (for which see FIGS. 1 and 2). But each diode is capable of greatly increasing its light intensity when briefly overdriven by current derived from the discharge of a capacitor 36 to which both are connected. The capacitor 36 is charged by a suitable source of control power (not shown), and its discharge through the diodes 31 and 32 is triggered by turning on (closing) a switch 37 therebetween. Preferably the switch 37 comprises a thyristor or silicon controlled rectifier which is periodically turned on by the train of electrical control pulses applied to the input terminal 1. Because of the short duration of the recurrent capacitor discharge current, the diodes 31 and 32 are not overheated. Proper operation of this means for overdriving the light emitting diodes can be monitored by a neon tube 38 or the like connected in series with a resistor 39 across the capacitor 36. The low-level biasing technique just described not only increases the visibility of the light emitted by the two diodes 31 and 32, thereby assisting the monitoring function, but also permits an operator to check these elements for readiness to operate before actually applying the control pulses to terminal 1. The latter benefit makes this technique useful with systems that transmit radiant energy other than visible light, in which case the monitoring function would be performed by the originally described sensor-amplifier-indicator combination.

FIG. 4 also illustrates a typical light- to-electricity converter that can be used in conjunction with the common light source 31, 32 described above. Light from an associated light path (not shown) impinges on a light sensitive element 26 which is shown by way of example as a light-activated silicon controlled rectifier, although a phototransistor or the like can be used. This element is connected in series with a pulse transformer 41 across a capacitor 42 which is charged by a suitable source of control power. When activated by a high intensity pulse of light, the element 26 begins to conduct appreciable emitter current, whereupon the capacitor 42 can discharge through the transformer 41 whose output winding is consequently energized. A resistor 43 is connected between the base and emitter of the element 26, and a choke 44 is connected in parallel therewith. The choke shunts the base-emitter junction of 26 with a low impedance path for steady-state current produced by ambient light, whereby this element is normally quiescent and operates only in response to an abrupt increase in the intensity of the received light. Other means, such as capacitor-coupling between the light activated element 26 and an output stage, can alternatively be used to prevent operation of the receiver in response to the weak light normally emitted by the light sources 31 and 32. It will be apparent that in a receiving station like that shown at 9 and 9′ in FIG. 2, the light activated element 26 of FIG. 4 can be electrically paralleled by a duplicate element which is supplied with light from a separate light guide.

Figure 5:
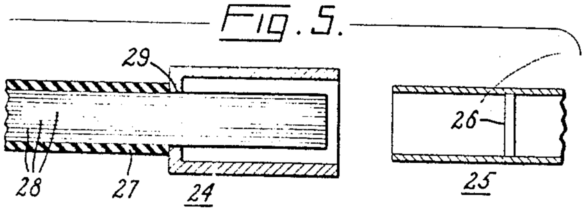
FIG. 5 is a detailed drawing of one end of the optical signal transmission system.

As is shown in FIG. 5, for easy disassembly of a light guide from the light-electricity converter at either end thereof, the tip of each light pipe can be mounted within a connector plug 24. This plug is suitably attached to the end of the light pipe so as to concentrically surround the tip thereof; the exposed surface of the tip must be optically clean and undamaged. A mating receptacle 25 has a light-electricity converter recessed therein so that when the plug and receptacle are assembled, the light guide tip and the converter are in the proper physical relationship to each other. By way of example, FIG. 5 depicts the output end of a light pipe, and therefore the converter recessed in the cooperating receptacle 25 is symbolically shown as an element 26 for converting light from the associated light pipe to an electrical output signal. Various types of standard plugs and receptacles can be used. Standard RF connector plugs and receptacles have been found to be useful to insure that the connection is light tight and air tight to keep foreign matter and moisture away from the short length of light path which passes through the atmosphere.

It can be seen in FIG. 5 that the light pipe has its outer sheath 27 removed from a portion of the light guide adjacent the end thereof so that the bundle of individual optical fibers 28 makes intimate contact with the metal of the connector plug 24. In high voltage installations, a possibility exists that the gross potential difference between input and output ends of a long light guide will concentrate at one (or both) of its ends and result in an undesirably high voltage drop across the thin bulk of the jacket material where it would contact the metal plug. This possibility arises because the material of the jacket 27 may very likely have considerably higher electrical resistivity than the bundle of optical fibers 28. The high electrical stress at this point could cause relatively rapid deterioration of the light guide and/or sparkover. Removing the jacket material from the light guide before assembling it to the fitting, whereby there is direct contact between the optical fibers and the metal, avoids a high voltage drop across the jacket material and results in a substantially uniform voltage gradient from one end of the light guide to the other. Essentially the same result could be achieved if the jacket material, at least in the vicinity of the plug 24, were made of material having a resistivity equal to or lower than the surface resistivity of the fibers. A preferred arrangement is to remove the sheath 27 and impregnate the space between the optical fibers and the metal plug with a conducting cement 29 such as a conducting formulation of epoxy. Likewise the opposite end of the light guide should be similarly treated as by using conducting epoxy within the metallic enclosure 15. These methods result in a substantially uniform voltage gradient from one end to the other of the light pipe.

Although the plug and receptacle mounting arrangement described above has been described with particular reference to the output ends of the light guides, the same kind of arrangement could be used at the input ends of the light guides; that is, the light emitters 2 and 3 can be mounted in either plugs or receptacles with the source tips of the optical fiber paths mounted in mating receptacles or plugs so that when the two are assembled the electricity-to-light converters are held in proper alignment with the tips.

Although my light guide signal transmission system has been described herein with reference to transmitting control signals to apparatus operated at a high voltage above ground, it will be obvious to those skilled in the art that various changes and modifications may be made without departing from the invention in its broader aspects. Therefore, it is intended that the appended claims cover all such changes and modifications as fall within the true spirit and scope of the invention.

What is claimed as new and desired to be secured by Letters Patent of the United States is:

1. In a redundant system for transmitting signals between a common source and two or more separate destinations, the combination of:

(a) at least first, second, third, and fourth generally parallel radiant-energy paths each having an input end and an output end;

(b) first means associated with the output ends of said first and second paths for producing an electrical output signal in response to the impingement thereon of radiant energy from either said first path or said second path;

(c) second means associated with the output ends of said third and fourth paths for producing another electrical output signal in response to the impingement thereon of radiant energy from either said third or said fourth path; and (d) third means associated with the input ends of all of said paths for substantially simultaneously supplying pulses of radiant energy to all of said paths on receipt of a corresponding electrical input signal from the common source.

2. The system of claim 1 including bias means for continuously energizing said third means, said third means being arranged to supply relatively weak radiant energy while energized solely by said bias means and to supply radiant energy of substantially greater intensity on receipt of said electrical input signal, each of said first and second means being normally quiescent and being operative to produce its electrical output signal when said radiant energy of greater intensity is supplied.

3. The system of claim 1 in which said third means comprises: (i) first radiant energy emitting means associated with the respective input ends of said first and third paths for simultaneously supplying radiant energy to both of said first and third paths when activated, (ii) second radiant energy emitting means associated with the respective input ends of said second and fourth paths for simultaneously supplying radiant energy to both of said second and fourth paths when activated, and (iii) means adapted to be coupled to the common source for activating both radiant energy emitting means in response to receipt of said electrical input signal.

4. The system of claim 3 in which said radiant energy is light and said first, second, third, and fourth paths comprise optic fibers arranged in at least two sets of at least two different fibers each, and in which a separate sheath is provided for each of said sets of fibers.

5. The system of claim 3 including bias means for continuously energizing said first and second radiant energy emitting means, each of said emitting means being arranged to emit relatively weak radiant energy while energized solely by said bias means and to emit radiant energy of substantially greater intensity on receipt of said electrical input signal, each of said output signal producing means being normally quiescent and being operative to produce its electrical output signal when said radiant energy of greater intensity is emitted.

6. The system of claim 5 including monitoring means for detecting failure of either one of said radiant energy emitting means, said monitroing means comprising at least one pair of wave guides having inlets respectively disposed in proximity to one end of said first radiant energy path and to a corresponding end of said fourth radiant energy path and having outlets disposed at remote locations where the loss of radiant energy in either one of said wave guides due to malfunction of a radiant energy emitting means can be conveniently sensed.

7. In a signal transmission system, the combination of:

(a) a plurality of electricity-to-light converters adapted to emit light in response to electrical input pulses applied thereto;

(b) a plurality of light guides having input and output ends, each of said light guides comprising a plurality of parallel optic fibers;

(c) a separate light-to-electricity converter associated with the output end of each of said light guides and adapted to produce an electrical output signal on receipt of light from the associated guides and (d) a plurality of source tips disposed in proximity to said electricity-to-light converters, respectively, each of said source tips comprising an approximately equal number of separate optic fibers of each light guide at said input end thereof.

8. The transmission system of claim 7 including an enclosure in which said optic fibers at the input end of each of said light guides are separated and recombined to form said source tips, said enclosure including means for maintaining said optic fibers in place.

9. The transmission system of claim 8 in which said last mentioned means comprises transparent potting material having an index of refraction less than that of said optic fibers so as to function as replacement for any damaged cladding on said optic fibers.

10. The transmission system of claim 7 including for each electricity-to-light converter light monitoring means comprising a photosensor disposed to be activated by light emitted from the converter, an amplifier for amplifying a signal from said photosensor, and an indicator connected to each amplifier.

11. The transmission system of claim 7 including for each electricity-to-light converter light monitoring means comprising at least one additional optic fiber disposed to carry light from the converter to a remote monitoring sensor.

12. In a control signal transmission system having a light guide optical link, an optical-electrical interface comprising: an elongated light guide, a connector plug attached to one end of said light guide and surrounding the tip of said one end, a mating receptacle for said connector plug, and a light-electricity converter mounted in said receptacle so that when said plug and receptacle are connected, said light-electricity converter is in alignment with said light guide tip.

13. The optical-electrical interface of claim 12 in which said light guide comprises a plurality of optic fibers enclosed in an insulating sheath which is removed from said fibers at said one end of said light guide, and in which conducting cement is disposed between said optic fibers and said connector plug, whereby the gross potential difference between said plug and the opposite end of said light guide is not concentrated at said one end.

14. An optical-electrical interface in accordance with claim 12 in which said light guide comprises a plurality of optic fibers enclosed in an insulating sheath which, at least at said one end of said guide, comprises a material having a resistivity equal to or lower than the surface resistivity of said optical fibers so as to insure a substantially uniform voltage gradient between said plug and the opposite end of the light guide.

15. The system of claim 1 in which the operation of said third means is monitored by providing at least two radiant energy sensing means associated respectively with one end of said first path and a corresponding end of said fourth path for indicating the loss of radiant energy in either one of these paths.

References Cited

UNITED STATES PATENTS

| | | | |
|---|---|---|---|
| 2,881,976 | 4/1950 | Grfanias | 250—227 |
| 3,215,846 | 11/1965 | McNaney | 250—227 |
| 3,244,894 | 4/1966 | Steele et al. | 250—227 |
| 3,414,733 | 12/1968 | Wunderman | 250—227 |
| 3,432,676 | 3/1969 | Lindberg | 250—227 |

WALTER STOLWEIN, Primary Examiner

M. ABRAMSON, Assistant Examiner